No. 616,449. Patented Dec. 27, 1898.
E. V. BRAKE.
MACHINE FOR CUTTING NOODLES.
(Application filed Sept. 15, 1898.)
(No Model.)
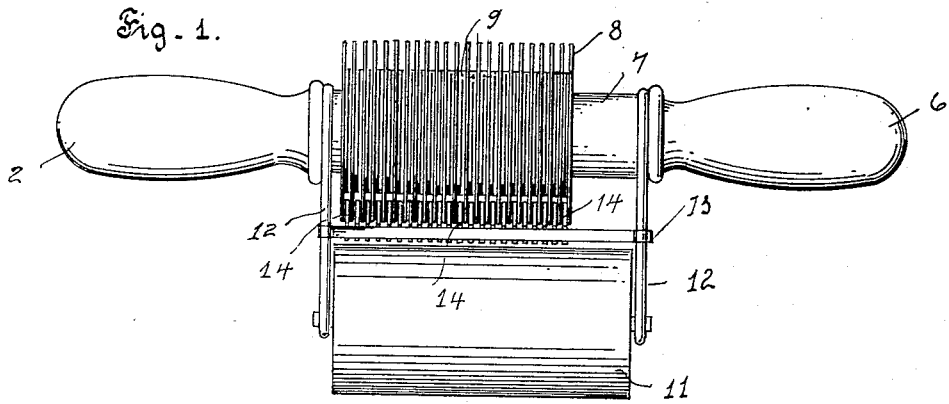
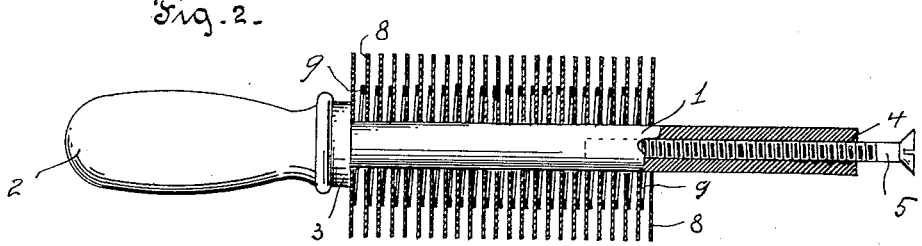
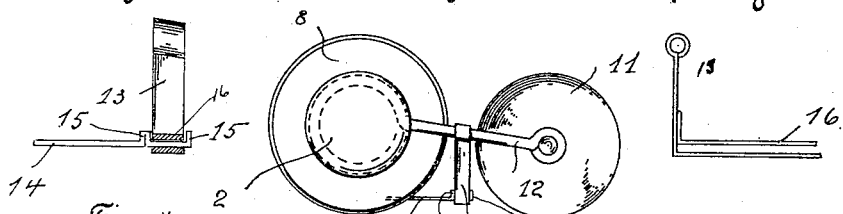
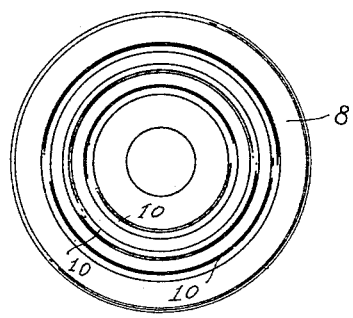
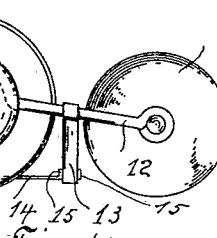
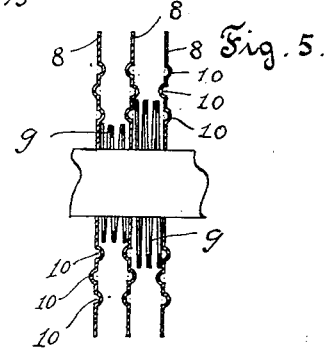
Witnesses—
Herman H. Martin
Martha Myers.
Inventor.
Eulalia V. Brake
By M. K. Terry
her Attorney.
THE NORRIS PETERS CO., PHOTO-LITHO., WASHINGTON, D. C.

UNITED STATES PATENT OFFICE.

EULALIA V. BRAKE, OF TOLEDO, OHIO.

MACHINE FOR CUTTING NOODLES.

SPECIFICATION forming part of Letters Patent No. 616,449, dated December 27, 1898.

Application filed September 15, 1898. Serial No. 690,990. (No model.)

*To all whom it may concern:*

Be it known that I, EULALIA V. BRAKE, of Toledo, county of Lucas, and State of Ohio, have invented new and useful Improvements in Machines for Cutting Noodles; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a noodle-cutter, and has for its object to provide an article of this character having a plurality of cutter-disks movably mounted upon an arbor and means interposed between the cutter-disks adapted to urge the same apart, whereby by suitable adjustment of the handles the dough may be reduced to strips of any desired width.

The object of my invention is accomplished by the interposition of springs between the cutter-disks, which are movably mounted upon an arbor, having a handle integral therewith upon one end and having an internal screw-threaded orifice formed in the axis of the arbor upon the opposite end, into which there is run a screw through the handle, whereby by means of the revolution of the screw the distance between the cutter-disks may be adjusted to any desired width. I have also provided a following roller, pivotally mounted to cutter-arbor, and provided a stripper or separator having movable stripper-blades projecting toward and between the cutter-disks to compensate for any lateral adjustment of cutter-disks.

In the drawings, Figure 1 is a plan view of a cutter constructed in accordance with my invention. Fig. 2 is a part elevation and part section of the arbor. Fig. 3 is a side elevation of the cutter. Fig. 4 is a side elevation of the cutter-disks. Fig. 5 is a part section and part elevation of a plurality of disks mounted upon the arbor and showing the springs interposed between the disks. Fig. 6 is an elevation of one of the springs. Fig. 7 is a section through the stripper-guide. Fig. 8 is a front elevation thereof.

1 designates an arbor having integral therewith a handle 2 and an intermediate enlarged shoulder 3. Upon the end 4 of the arbor there is formed an orifice passing inwardly through the axle-center for some distance and is screw-threaded to receive a screw 5, which may be run therein to any distance for a purpose hereinafter stated.

6 designates the opposite handle, having integral therewith a shoulder 7, and is provided with an aperture through the center to receive the arbor 1 and a reduced aperture to receive the screw 5. The disks 8 are mounted upon the arbor 1, and interposed between the disks there are springs 9, adapted to normally urge the disks apart to increase the distance between them, which may be adjusted by running the screw 5 in or out of the arbor 1, and thereby producing dough strips of any desired width. The disks 8 may be formed out of a flat sheet of metal, or when formed of light metal provided with a plurality of beads projecting alternately toward opposite sides.

11 designates a following roller for depressing the strips of dough, and is of a length commensurate to the maximum adjustment of the disks and is journaled in brackets 12, pivotally mounted upon the shoulders 3 and 7 of the handles 2 and 6, respectively.

In order to guard against dough being carried upward by the revolution of the disks, I have provided a separator 13, pendently supported from the brackets 12 and comprising a plurality of prongs 14 and projecting between in beyond the edge of the disks, and which prongs are movably held by the shoulders 15, projecting upward upon either side of the guide-bar 16. It will be seen thereby that I have provided for coincident adjustment of the disks and constructed a convenient and cheap article of manufacture for kitchen use.

What I claim is—

In a noodle-cutter an arbor having a handle integral therewith and an intermediate shoulder, a screw-threaded orifice formed upon one end of the arbor adapted to receive a screw inserted through the opposite handle, a plurality of disks movably mounted upon the arbor, springs interposed between the same, a shoulder formed upon the detachable handle, brackets pivotally mounted upon the shoulders formed upon the handles, a roller journaled in the outer end of the brackets and a separator pendently supported from the brackets comprising a plurality of prongs movably held between guides to compensate for the adjustment of the disks.

In testimony that I claim the foregoing as my own I hereby affix my signature in presence of two witnesses.

EULALIA V. BRAKE.

Witnesses:
PEARL WILSON,
WILLIAM K. TERRY.